United States Patent

[11] 3,557,876

[72] Inventor Art Tragesser
 Houston, Tex.
[21] Appl. No. 815,221
[22] Filed Apr. 10, 1969
[45] Patented Jan. 26, 1971
[73] Assignee The Western Company of North America
 Fort Worth, Tex.
 a corporation of Delaware

[54] METHOD AND COMPOSITION FOR DRILLING AND CEMENTING OF WELLS
 10 Claims, No Drawings
[52] U.S. Cl. ................................................ 166/292,
 175/72, 252/8.5
[51] Int. Cl. ..................................................... E21b 21/04,
 E21b 33/138, E21b 33/14
[50] Field of Search ............................................ 175/65, 72;
 166/292—294; 252/(Inquired), 8.5B, 8.5LC;
 106/84, (Inquired)

[56] References Cited
 UNITED STATES PATENTS
2,649,160 8/1953 Williams et al. ............. 166/292
2,776,112 1/1957 Ilfrey et al. .................... 166/293X
2,890,169 6/1959 Prokop ......................... 166/293X
3,168,139 2/1965 Kennedy et al. .............. 166/292
3,228,469 1/1966 Kern et al. .................... 175/72X
3,409,093 11/1968 Cunningham et al. ........ 175/72X
3,467,193 9/1969 Messenger ................... 166/292

OTHER REFERENCES

Kostrop, J. E. True Pozzolan Cement Developed For Oil-field Use. In Petroleum Engineer, Nov., 1955. pp. B-33 thru B-36. (Copy in 166— 292)

*Primary Examiner*—Marvin A. Champion
*Assistant Examiner*—Ian A. Calvert
*Attorney*—Richards, Harris & Hubbard ABSTRACT: A drilling fluid for oil and gas wells which can be converted to a cementitious material suitable in well-cementing operations. The preferred drilling fluid has a water base and contains pozzolan and sufficient colloidal clay to form a thin but effective filter cake on the walls of the borehole during the drilling operation. When desired, an alkaline earth hydroxide, such as calcium hydroxide, is introduced into the drilling fluid to form a cementitious material for use in the borehole, for example, for cementing the casing in the borehole.

METHOD AND COMPOSITION FOR DRILLING AND CEMENTING OF WELLS

This invention relates to drilling fluids. In another aspect this invention relates to a novel drilling fluid which is easily converted to a cementitious material. In still another aspect, this invention relates to a novel method of cementing a well.

In the cementing of oil and gas wells it is conventional to mix a hydraulic cement, such as Portland cement, with the requisite amount of water to form a pumpable slurry, and to pump the slurry into the proper place within the well. Frequently, when completing an oil or gas well, a cement slurry is passed down through a casing which has been inserted in the borehole, and then upwardly through the annular space formed between the outside of the casing and periphery of the borehole. The cement is then allowed to harden and thereby hold the casing firmly within the borehole. Cement slurries are passed into the well for various other reasons including squeeze cementing, plugging the well or the earth formation adjacent the same, and grouting or sealing crevices, cracks or holes and manmade formations.

When completing the well by cementing the casing within the borehole, it is generally necessary that a solid bond be established between the cement, casing, and walls of the borehole to prevent migration of fluids through the annular cemented space. This migration of fluids results in unwanted communication between formations, for example, communication between water and oil-producing formations. Deposits of conventional drilling fluid on the walls of the borehole and on the outer periphery of the casing result in poor contact between the cement and the surfaces to be cemented, and therefore cause a poor bond therebetween. Consequently, various methods have been developed for removing these contaminating deposits of drilling fluid from the surfaces to be cemented. These techniques include (1) the passage of highly nonviscous cement through the annular space to flush the drilling fluid from the surfaces, (2) passage of a highly viscous cement through the annular space at a relatively high velocity to push the drilling fluid from the surfaces to be cemented, (3) the passage of a highly viscous cement into the annulus at relatively low velocities to "float" the drilling fluid out of the annulus and away from the surfaces to be cemented, (4) chemical washes to thin the drilling fluid and remove unwanted deposits thereof from the surfaces to be cemented, and (5) mechanical aids used on the casing such as reciprocating and rotating scratchers. These methods are generally time consuming and somewhat ineffective in removing contaminating amounts of drilling fluid from the annulus.

Another problem involved in conventional operations for cementing a casing within a borehole occurs because the conventional drilling fluids contain materials such as colloidal clays which deposit a filter cake on the walls of the borehole. During the drilling operations, this filter cake is beneficial in that it serves as a relatively impermeable barrier to prevent the liquid portion of the drilling fluid from leaching into the subsurface formation surrounding the borehole. However, this filter cake is a hindrance during cementing operations because it is incompatible with the cement, and therefore does not allow the cement to effectively penetrate the earthen surface of the borehole. Then, after the cementing operation, the filter cake frequently breaks down and allows fluids to penetrate between the annular cement body and the earthen formation. This will allow the unwanted migration of fluids between the subsurface formation.

One object of this invention is to provide an improved drilling fluid which can be converted into a cementitious material, and thereby avoid problems of contamination by deposits of drilling fluid on the surfaces to be cemented as heretofore known in the art.

Another object of this invention is to provide a new drilling fluid which will form an effective filter cake on the walls of the borehole during the well-drilling operation, which filter cake can be later converted into a cementitious material that bonds well and is fully compatible with the cementitious material in the annulus defined between the earthen walls of the borehole and the well casing.

A further object of this invention is to provide a new method of completing a well.

According to one embodiment of this invention, I have found that by adding a small but effective amount of pozzolan to an aqueous drilling fluid containing a colloidal clay such as bentonite, a relatively impermeable and thin drilling fluid filter cake can be formed on the walls of the borehole which can later be converted into a hard cementitious material.

According to another embodiment of this invention, a well bore is drilled using the circulating drilling fluid of the above embodiment, and subsequently an effective amount of an alkaline earth hydroxide is added to the fluid to form a cementitious material to serve effectively as cement for well-cementing operations.

In another but lesser preferred embodiment, an aqueous drilling fluid containing alkaline earth hydroxide is used for drilling the well bore, and subsequently an effective amount of pozzolan is added to the drilling fluid to form a cementitious material which is forced into the well during a cementing operation.

The drilling fluid of this invention comprises water, colloidal clay and pozzolan. This fluid can also contain conventional additives such as fluid loss additives, thinners, thickeners, emulsifiers and the like.

Pozzolan is defined as a siliceous material (generally about 50 percent silicon oxide) containing various percentages of other oxides such as magnesium oxide, aluminum oxide, and iron oxide. These materials will, in finely divided form and in the presence of moisture, react with an alkaline earth hydroxide, at the temperatures normally encountered in the drilling of a well, to form a relatively stable and water insoluble compound possessing cementitious properties. Natural pozzolans may be derived from volcanic rocks and include pumicites or volcanic ashes, pumice or pumice stone, obsidian, scoria, tuffs and some of the andesites, or they may be derived from rocks in which the silica has a high opaline content including diatomites, or diatomaceous earths, cherts, shale, clays and pure opal. Pozzolans also include fly ash or flue dust, certain boiler and furnace slags, burnt ground brick and byproducts of certain industrial processes.

Any conventional colloidal clay such as bentonite or attapulgite can be used in the practice of the invention.

Specific examples of additives which can be present in the drilling fluid of this invention include gelling agents such as starch; thinning agents such as calcium lignin sulfonate, sulfonated sodium naphthalene, sodium acid pyrophosphate, sodium chloride, and calcium chloride; pH control agents such as sodium hydroxide; lubricating agents such as diesel oil; and conventional surfactants and emulsifying agents.

The pozzolan within the drilling fluid of this invention is in particulate form and generally has a particle surface area ranging from 1,000 to 5,000 cm.2/g., preferably about 2,000 cm.2/g. The drilling fluid contains sufficient pozzolan to form a substantially uniform deposit within a filter cake comprising pozzolan and a conventional colloidal clay material such as bentonite. Thus, when the filter cake is later contacted with an alkaline earth hydroxide, a cementitious material will form on the walls of the borehole. Generally the pozzolan will be present in the drilling fluid from about 35 to about 80, preferably from 60 to 80 percent by weight of the total drilling fluid, depending upon the amount of other additives present. The colloidal clay will be present in a range of about 3 to about 8, preferably from about 5 to 6 percent by weight of the total drilling fluid. Also the water will generally be present in the drilling fluid from 40 to 80 percent by weight of the total drilling fluid.

The drilling fluid of this invention is utilized according to conventional techniques. For example, the drilling fluid is passed downward through a hollow drill stem having a drill bit positioned on the end thereof and passes from the hollow drill stem adjacent its lower end and upwardly through the annulus formed between the drill stem and the resulting earthen walls of the borehole. The fluid will lubricate and cool the drill bit while carrying the cuttings upwardly out of the borehole in a conventional manner. During the circulation operation just described, a thin and relatively impermeable filter cake containing pozzolan will be deposited on the walls of the borehole.

When it is desired to introduce cement into the borehole, for example, to cement a casing which has been positioned within the borehole, an alkaline earth hydroxide is added to the drilling fluid to form a cementitious material which is forced through the annular space between the periphery of the casing and the walls of the borehole. The alkaline earth hydroxides are preferably formed in the aqueous drilling fluid by adding particulate alkaline earth oxide thereto which reacts with the water to form the respective hydroxide. The alkaline earth oxides which can be utilized in this invention include calcium oxide, strontium oxide and barium oxide, preferably calcium oxide. The amount of alkaline earth oxide added to the slurry should be sufficient to react with the aqueous pozzolan mixture and form a cementitious material. Generally from two to 25, preferably from 10 to 12 parts by weight of alkaline earth hydroxide per part by weight of pozzolan should be introduced into said drilling fluid. The viscosity of the slurry will vary with the pozzolan-water-alkaline earth oxide ratio, but can also be controlled by the addition of conventional thinning agents. When forming the cementitious material, the alkaline earth oxide can be metered into the drilling fluid. For example, when cementing a casing in the borehole, the alkaline earth oxide can be continuously introduced into the drilling fluid which is pumped through a hollow drill stem to the bottom of the borehole, and pumped upwardly through the annulus between the casing and the borehole. This operation will continue until the cementitious material has completely filled the annulus.

In some operations it is desirable to add additional pozzolan to the drilling fluid at the time the alkaline earth oxides are added thereto. This is particularly true when smaller amounts of pozzolan in the range of from 10 to 20 parts by weight of the drilling fluid were initially contained therein for the purpose of building a filter cake in conjunction with a conventional colloidal clay such as bentonite. It is generally preferred that the additional pozzolan be added in an amount sufficient to yield a pozzolan-water weight ratio in the cementitious material of at least about 1:3.

It is noted that the converted drilling fluid of this invention can be used in other cementing operations such as squeeze cementing, and the sealing of porous formations. The use of the convertible drilling fluid of this invention is especially helpful when filling a porous formation after the circulation of the drilling fluid has been lost. In this operation well completion is expedited by merely metering desired amounts of the alkaline earth hydroxide, and/or additional pozzolan and fill materials into the drilling fluid which is being directed into the borehole. When the porous formation has been filled with cementitious material and the cement has sufficiently hardened, the drilling operation can then be continued.

It is noted that the process of this invention can be carried out by initially introducing the alkaline earth hydroxide into the aqueous drilling fluid and then subsequently adding the pozzolan material thereto to form the cementitious material. In this embodiment, the aqueous drilling fluid will preferably initially contain from about 55 to about 95 weight percent alkaline earth hydroxide. This method is effective in shallower wells wherein the weight of the drilling fluid is relatively low (below about 12 pounds per gallon). At higher drilling fluid weights, the alkaline earth hydroxide has a tendency to leak excessively into the surrounding formation. Therefore, in deeper wells wherein the weight of the drilling fluid normally exceeds 12 pounds per gallon, such as for example, fluids containing weighting materials such as borite, it is preferred that the drilling fluid initially contain pozzolan and that the alkaline earth hydroxide be subsequently added thereto to form the cementitious material.

Thus, when operating with the drilling fluid containing either the alkaline earth hydroxide or the pozzolan material and other conventional ingredients, the basic functions of the drilling fluid, i.e., lubrication, cooling, removal of cuttings, etc., are performed, but yet this fluid can be readily converted to a hydraulic cementitious material which is not contaminated by the deposits of the original drilling fluid within the well bore. The resulting cementitious material forms a cement which is resistant to corrosion from brine and sulfate waters, has very low permeability to subterranean fluids, and is stable at elevated temperatures and pressures. Additionally, the pozzolan is uniformly distributed in a filter cake of pozzolan and a colloidal clay and the subsequent contact of the alkaline earth hydroxide will harden the filter cake into a cement material.

While this invention has been described in reference to its preferred embodiments, various modifications which fall within the scope of the appended claims will now be apparent to one skilled in the art upon reading this application.

I claim:

1. A method of completing a well after a borehole is drilled in the earth's surface using a circulating drilling fluid consisting essentially of water and from about 35 to about 80 percent by weight of pozzolan comprising:
   a. suspending a casing in said bore hole containing said drilling fluid;
   b. circulating said drilling fluid downwardly through said casing and upwardly through the annulus formed by said casing and the walls of said bore hole;
   c. depositing an alkaline earth hydroxide in said circulating drilling fluid sufficient to react therewith and form a cementitious fluid in an amount to substantially fill said annulus; and
   d. stopping the circulation of said fluid when said annulus is filled with said cementitious fluid and allowing said cementitious fluid to solidify in said annulus.

2. The method of claim 1 wherein said alkaline earth hydroxide comprises calcium hydroxide.

3. A drilling and cementing method comprising:
   a. drilling a borehole in the earth's surface and circulating through said borehole during said drilling a drilling fluid containing water and from about 55 to about 95 weight percent alkaline earth hydroxide;
   b. thereafter adding sufficient pozzolan to said drilling fluid to form a cementitious material; and
   c. introducing said cementitious material into said borehole.

4. The method of claim 3 wherein said alkaline earth hydroxide comprises calcium hydroxide.

5. A drilling and cementing method comprising:
   a. drilling a borehole in the earth's surface and circulating through said borehole during said drilling a drilling fluid containing from about 35 to about 80 weight percent pozzolan;
   b. thereafter adding sufficient alkaline earth hydroxide to said drilling fluid to form a cementitious material; and
   c. introducing said cementitious material into said borehole.

6. The method of claim 5 wherein said alkaline earth hydroxide comprises calcium hydroxide.

7. The method of claim 5 wherein said cementitious material is introduced into a porous formation communicating with said borehole.

8. The method of claim 5 wherein said drilling fluid further comprises a colloidal clay, and wherein said circulation causes a filter cake comprising said colloidal clay and pozzolan to be formed on the walls of said borehole so that the addition of said alkaline earth hydroxide to said drilling fluid, upon contact with said filter cake forms a cementitious material of said filter cake.

9. An aqueous drilling fluid which is settable by the addition of an alkaline earth hydroxide thereto, consisting essentially of from 40 to 80 weight percent water, from about 3 to about 8 weight percent of colloidal clay, and from about 35 to about 80 weight percent pozzolan.

10. The drilling fluid of claim 9 wherein said colloidal clay is selected from bentonite and attapulgite.